US008498587B2

(12) United States Patent
Boesen

(10) Patent No.: US 8,498,587 B2
(45) Date of Patent: *Jul. 30, 2013

(54) CELLULAR TELEPHONE AND PERSONAL DIGITAL ASSISTANT

(76) Inventor: Peter V. Boesen, Des Moines, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/185,734

(22) Filed: Jul. 19, 2011

(65) Prior Publication Data

US 2012/0184211 A1 Jul. 19, 2012

Related U.S. Application Data

(60) Continuation of application No. 10/939,940, filed on Sep. 13, 2004, now Pat. No. 7,983,628, which is a continuation-in-part of application No. 09/416,168, filed on Oct. 11, 1999, now Pat. No. 6,560,468, and a continuation of application No. 09/587,743, filed on Jun. 5, 2000, now Pat. No. 6,408,081, said application No. 09/416,168 is a continuation-in-part of application No. 09/309,107, filed on May 10, 1999, now Pat. No. 6,094,492, said application No. 09/587,743 is a continuation of application No. 09/309,107, said application No. 10/939,940 is a division of application No. 10/368,924, filed on Feb. 18, 2003, now Pat. No. 6,892,082, which is a continuation-in-part of application No. 09/416,168, and a continuation-in-part of application No. 09/309,107, and a continuation of application No. 09/846,789, which is a continuation-in-part of application No. 09/587,743, and a continuation-in-part of application No. 09/416,168, said application No. 09/587,743 is a continuation of application No. 09/309,107, said application No. 09/416,168 is a continuation-in-part of application No. 09/309,107.

(51) Int. Cl.
*H04B 1/38* (2006.01)
(52) U.S. Cl.
USPC .......... 455/90.3; 455/41.1; 455/403; 455/573
(58) Field of Classification Search
USPC ........................................................ 455/90.3
See application file for complete search history.

(56) References Cited

U.S. PATENT DOCUMENTS

| 5,721,783 | A | * | 2/1998 | Anderson | 381/328 |
| 5,797,089 | A | * | 8/1998 | Nguyen | 455/403 |
| 6,021,207 | A | * | 2/2000 | Puthuff et al. | 381/330 |
| 6,424,820 | B1 | * | 7/2002 | Burdick et al. | 455/41.1 |
| 6,961,593 | B1 | * | 11/2005 | Lonka et al. | 455/573 |
| 2002/0198017 | A1 | * | 12/2002 | Babasaki et al. | 455/550 |

* cited by examiner

*Primary Examiner* — Ajibola Akinyemi
(74) *Attorney, Agent, or Firm* — Clifford Kraft

(57) ABSTRACT

The handheld personal electronic device has a first body having a display, a second body having a plurality of manual inputs, the second body capable of attachment to the first body, the personal electronic device having an open position wherein the display of the first body and the manual inputs of the second body are accessibly exposed. And, the personal electronic device having a closed position wherein the display of the first body is protected by the second body and the manual inputs of the second body are accessibly exposed.

1 Claim, 10 Drawing Sheets

CELLULAR TELEPHONE AND PERSONAL DIGITAL ASSISTANT

BACKGROUND OF THE INVENTION

1. Field of the Invention

The present invention relates to personal communications systems, including, but not limited to cellular telephones, personal digital assistants, pagers, and internet appliances.

2. Problems in the Art

The present invention relates to personal electronic devices and personal communication systems and many problems associated with such devices. One of the most recognized problems relates to hands-free communication. In voice communication systems, such as cellular telephones, it is more convenient and safer for voice communications to occur without requiring the use of hands. Many attempts have been made at solving this problem, resulting in cords running between headsets and cellular telephones, heavy and bulky headset units, and related problematic solutions. Another problem concerning personal electronic devices and personal communication systems is the increasing complexity of such devices. As technology improves, additional functionality has been given to cellular telephones, personal digital assistants, pagers, internet appliances, and other personal electronic devices. Increasing the complexity of the device generally involves increasing the number of buttons or controls associated with the device or otherwise making a device more hands intensive in operation.

Thus there is an even more pronounced problem when additional functionality is given to a personal digital assistant, cellular telephone, or related personal electronic device when that personal electronic device has been designed to provide additional functionality. The number of controls is increasingly providing greater difficulties in operating the device and there are greater difficulties in accessing the controls or buttons on the device. This is particularly true where some of the controls, such as a touch screen are protected.

Therefore, it is a primary objective, feature, or advantage of the present invention to provide an apparatus, and system which improve upon the state of the art.

It is another objective, feature, or advantage of the present invention to provide a system and apparatus of personal communication.

It is another objective, feature, or advantage of the present invention to provide a system and apparatus of hands-free communication.

It is a further objective, feature, or advantage of the present invention to provide a system and apparatus having accessible access to user controls.

It is a further objective, feature or advantage of the present invention to provide a system and apparatus that provides simplified access to a touch screen display.

It is a further objective, feature, or advantage of the present invention to provide a personal electronic device that includes a cellular transceiver and a personal digital assistant.

It is another objective, feature, or advantage of the present invention to provide a system and apparatus that includes a cellular transceiver, a personal digital assistant, and a pager.

It is a further objective, feature, or advantage of the present invention to provide a personal electronic device with a telephone keypad and a touch screen display, the telephone keypad and the touch screen display being simultaneously accessible.

These and other objectives, features, or advantages of the present invention will become apparent from the specification and claims.

BRIEF SUMMARY OF THE INVENTION

One aspect of the present invention relates to the physical configuration of a personal electronic device. The personal electronic device has a first body and a second body. In addition, there is means for connecting the first body to the second body. There is means for slidably moving the first body with respect to the second body and means for pivotally moving the first body with respect to the second body. This configuration of the present invention provides advantages over flip open-type devices. For example, when the first body has a display and the second body has a keypad, when in a closed position the personal electronic device allows the user access to the buttons on the keypad. In an open position the user has access to both the keypad as well as the display such as a touch-screen display.

Another aspect of the present invention is a system which includes the personal electronic device of the present invention in addition to an earpiece worn by the user. The earpiece may communicate with the personal electronic device through a short-range transceiver. The earpiece may include a bone conduction sensor and an air conduction sensor.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The present invention will be described as it applies to its preferred embodiment. It is not intended that the present invention be limited to the described embodiment. It is intended that the invention cover all modifications and alternatives which may be included within the spirit and scope of the invention.

Figure 1:
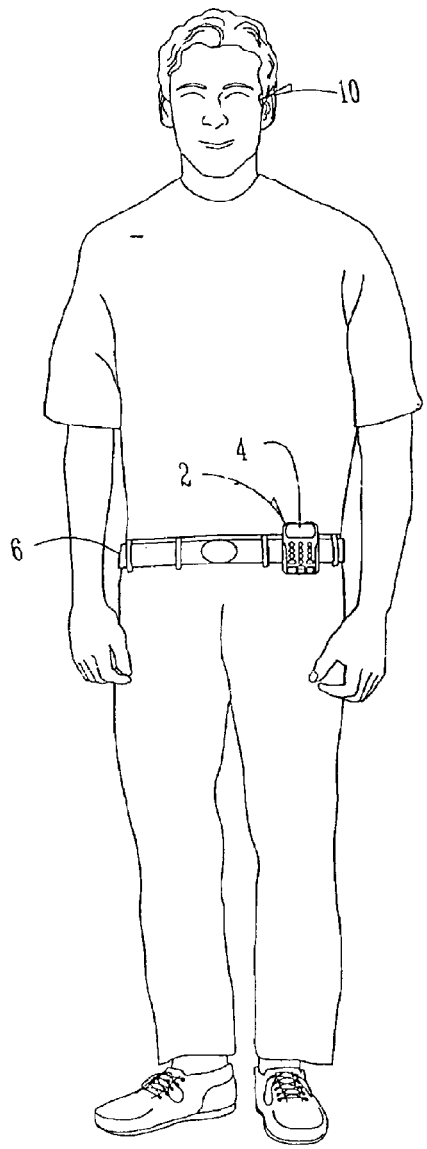
FIG. 1 is a diagram of a personal electronic device worn by a person according to the present invention.

FIG. 1 shows the personal electronic device 2 of the present invention as worn by a person. The personal electronic device as shown has a display 4 such as in a standard telephone transceiver. The device may be worn on a belt 6 as shown or may be placed in a pocket or may be carried by the person. Another addition to the system includes the earpiece 10 worn by the person.

Figure 2:
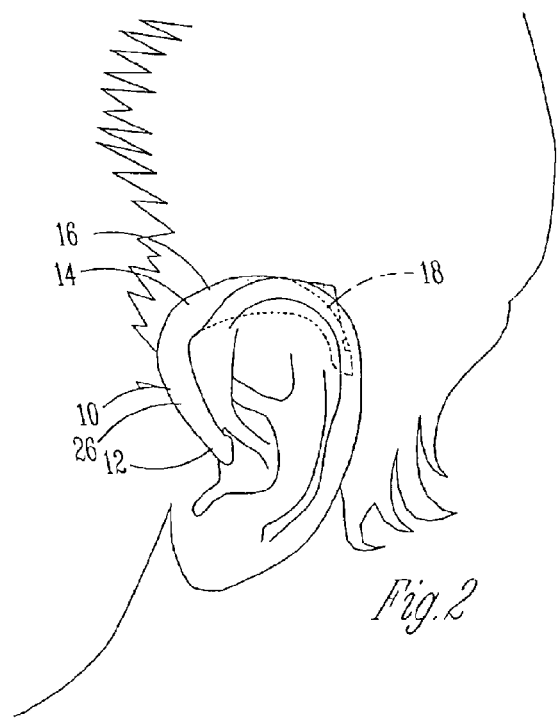
FIG. 2 is a representation of the earpiece of the present invention fitted on the ear.

FIG. 2 shows a pictorial representation of the earpiece 10 as worn in a person's ear. The earpiece has an external ear canal portion 12 which is fitted within the ear. The earpiece 10 has an ear attachment portion 14 fitted around the ear. The earpiece 10 in its preferred form houses a processor 16 and a transceiver 18.

Figure 3:
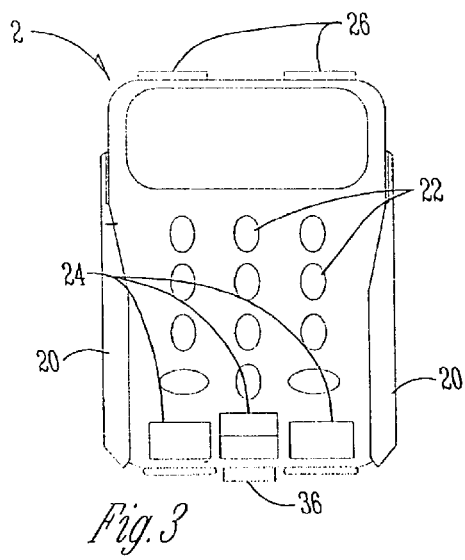
FIG. 3 is a diagram of the layout for the personal electronic device of the present invention in a closed position.

FIG. 3 is a diagrammatic representation of one embodiment of the personal electronic device 2 of the present invention. In FIG. 3, the personal electronic device 2 has a clip 20. The clip is used to attach the personal electronic device to a belt or pocket. The personal electronic device 2 also has a keypad 22. The keypad 22 may be a standard 12 key keypad such as typically used on telephones and cellular telephones. The present invention contemplates that additional function buttons 24 or other inputs may be used to provide additional functionality to the personal electronic device 2. The personal electronic device 2 may have a hinge 26. The hinge 26 permits the personal electronic device 2 to open. The opening of the personal electronic device 2 may be facilitated by an open button 36. The open button may be spring loaded or may be otherwise constructed to cause the personal electronic device 2 to open upon depression and/or release of open button 36.

It is to be further appreciated that the open button need not be mechanically connected to the hinge. The open button may simply be a button causing a digital signal change when pressed and/or released. The personal electronic device monitors the button's digital signal and when the open button signal changes an actuator is activated that opens the personal electronic device. The present invention contemplates this and other variations whereby a user can conveniently open the personal electronic device through use of a switch, button, latch, hook, or other physical means that is operated manually by a user or through voice activation or other electronic control.

Figure 4:
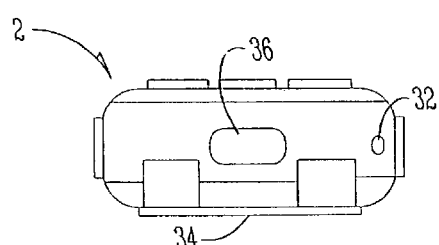
FIG. 4 is a view of the personal electronic device of the present invention in a closed position.

FIG. 4 shows a view of the bottom of the personal electronic device 2. The personal electronic device 2 may include an access port 32 and/or a vibration module 34. The access port 32 is used to provide additional functionality and communication capability. The access port may be a serial interface port such as for RS232 serial or USB. The access port may be an ethernet port, a firewire port, an infrared port conforming to the IrDA standard or other infrared standard. Wireless interfaces such as Bluetooth may also be used to provide access. The present invention contemplates that other types of interfaces may be used as may be known in the art.

The vibration module 34 is used to add tactile alert functionality to a personal electronic device 2. The vibration module 34 may contain one or more vibration motors. Preferably, the vibration motor is both small and low power. The personal electronic device 2 can be used as a pager or as a telephone, and when incoming calls or notifications are received, the vibration module can vibrate to alert the user of the message. The present invention also contemplates that the vibration module 34 can be used to alert the user of electronic messages or other events such as may be useful or desirable for the user to immediately be made aware of. For example, the vibration module may be activated by software executing on the PDA portion 28 of the device. Thus alarms may be set for any purpose including notifying a person of appointments, other reminders, incoming messages, or other reasons that may be useful or otherwise desirable.

Figure 5:
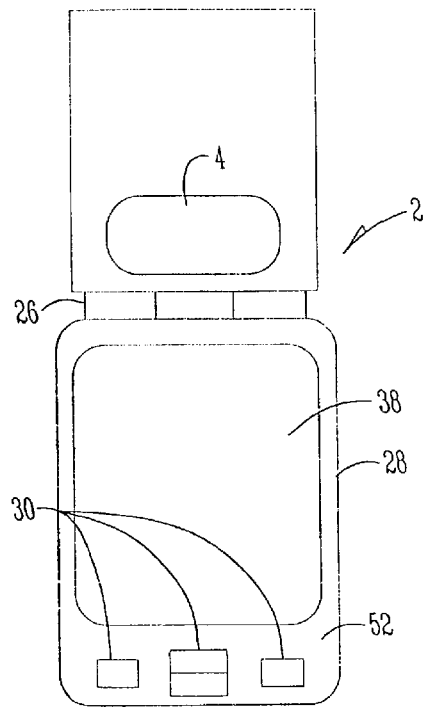
FIG. 5 is a top view of the personal electronic device of the present invention in an open position.

FIG. 5 shows one embodiment of the personal electronic device 2 of the present invention in an open position. One or more hinges 26 are opened to provide access to the PDA portion 28 of the personal electronic device 2. The term PDA is defined as a hand-held computer. The PDA portion 28 may include a touch screen 38 as well as additional PDA buttons 30 to add more functionality to the personal electronic device 2. The personal electronic device 2 may also have a transceiver 52 available. The use of transceiver 52 will be further explained in the context of the invention.

The PDA portion 28 may be an embedded computer or other device. For example, the PDA 28 may run Microsoft Windows, Microsoft Windows CE, the Palm OS, or other operating systems. The present invention is in no way limited by the type of processor used in the PDA, the operating system used by the PDA, or other variations. The PDA may be used for sending e-mail, taking notes, organizing one's schedule, web browsing, performing calculations, or any other function associated with a PDA or a computer. The PDA may include handwriting recognition functionality as may be known in the art. Examples of handwriting recognition software for Windows CE include ParaGraph's CALLIGRAPHER handwriting recognizer and Microsoft's TRANSCRIBER software. The PDA may also include specialized software. For example, when the PDA runs Windows CE, the software applications may be written in Microsoft Visual C++ or Microsoft Visual Basic or with any other computer language or software development tool. When the earpiece includes a bone conduction sensor, air conduction sensor, and a stereo transceiver, and the personal electronic device 2 includes a stereo transceiver as well, the PDA can be programmed to receive the stereo signals and perform processing to improve the speech signal. In addition, the PDA may also include voice recognition software so that when voice information is received, whether it be stereo or mono audio signals, the voice information may be used to control the PDA, control the telephone transceiver for voice to text applications, or other purposes. In addition, the voice software found on the PDA may be used in conjunction with audio received over the telephone transceiver. One example of voice recognition software available for Windows CE is ARTRECOGNITION from Advanced Recognition Technologies, Inc.

Figure 6:
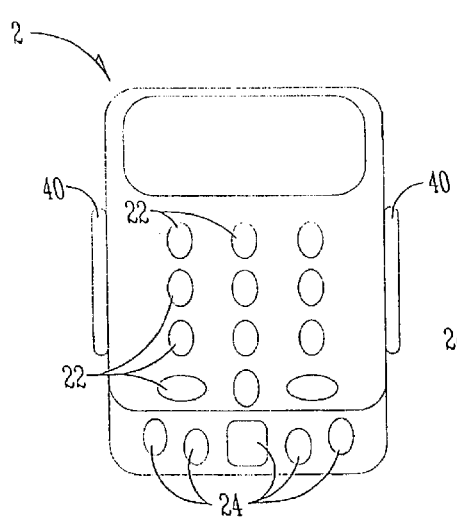
FIG. 6 is a top view of the personal electronic device of the present invention in a closed position.

FIG. 6 shows another embodiment of personal electronic device 2. In FIG. 6 the telephone transceiver portion of the personal electronic device 2 has a keypad 22 and also additional function buttons 24 available. Use of the term "telephone transceiver" should be construed broadly as to include radio telephones, cellular telephones, satellite telephones, and other types of voice communications devices. The function buttons 24 may be for use with the PDA. The cellular transceiver portion of the personal electronic device fits over the PDA portion of the device. A release button 40 may be used to cause the personal electronic device 2 to open. The release buttons 40 may be located on the side of the personal electronic device 2.

Figure 7:
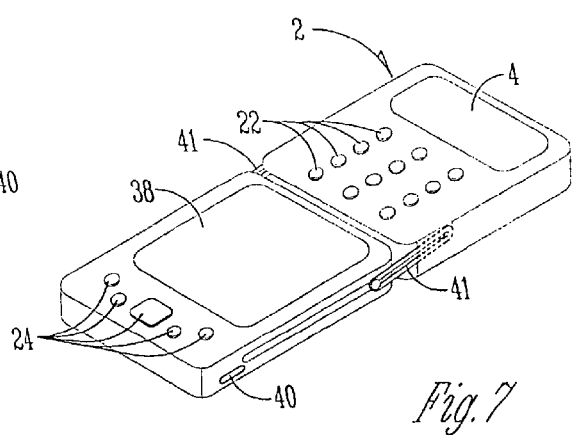
FIG. 7 is a diagram of the personal electronic device with a slide hinge.

FIG. 7 shows the personal electronic device 2 in an open position. The personal electronic device 2 opens in a manner such that both the PDA portion of the device and the cellular transceiver portion of the device are both accessible at the same time. The present invention contemplates that this functionality may be accomplished in numerous ways. For example, a slide hinge 41 is shown. The slide hinge 41 allows the cellular transceiver portion of personal electronic device 2 to slide past the PDA portion of the personal electronic device 2, so that both the cellular transceiver and the PDA are accessible at the same time. This configuration also permits the PDA display or touch screen to be protected when in a closed position. More than one slide hinge may be used, such as a slide hinge on each side of the device as shown. The present invention further contemplates that the PDA buttons 24 need not be accessible such that the cellular portion may completely cover the PDA portion when in a closed position.

Figure 8:
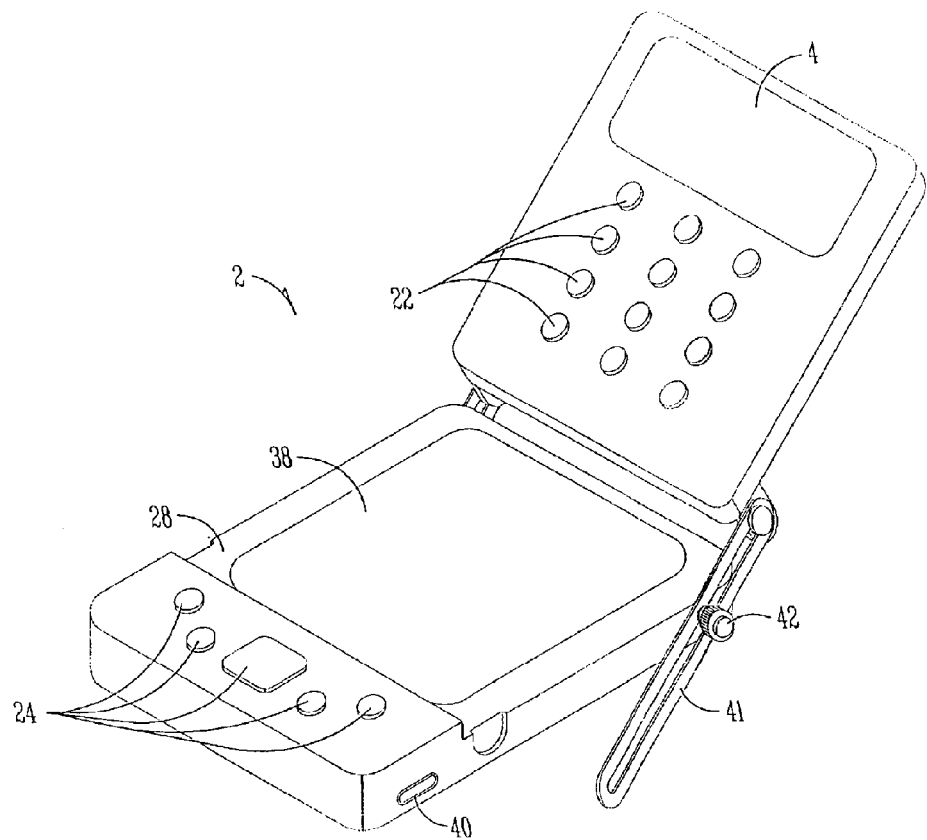
FIG. 8 is a diagram of the personal electronic device with the telephone transceiver portion positioned at an angle relative to the PDA portion.

FIG. 8 shows the personal electronic device 2 with a slide hinge 41. As shown, hinge 41 permits the telephone portion of the personal electronic device to open such that both the telephone key pad buttons 22 and the PDA portion 28 are available at the same time. A knob or button 42 may be used to secure the position of the slide hinge 41. The present invention permits the angle of the telephone portion relative to the PDA portion to be adjusted.

Figure 9:
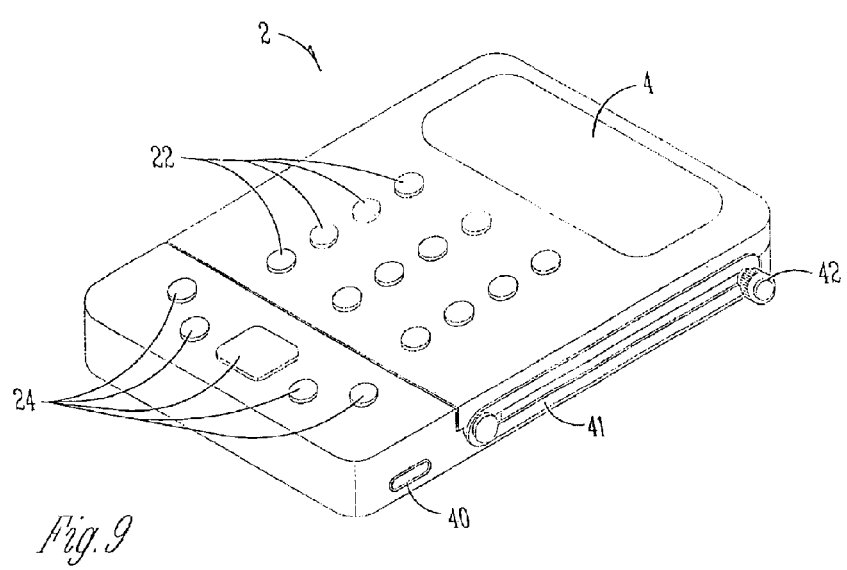
FIG. 9 is a diagram of the personal electronic device in a closed position.

FIG. 9 shows the personal electronic device 2 in a closed position. When in a closed position, the key pad buttons 22 are still available and the display 4 is also viewable. In addition, the PDA buttons 24 are also available as well.

Figure 10:
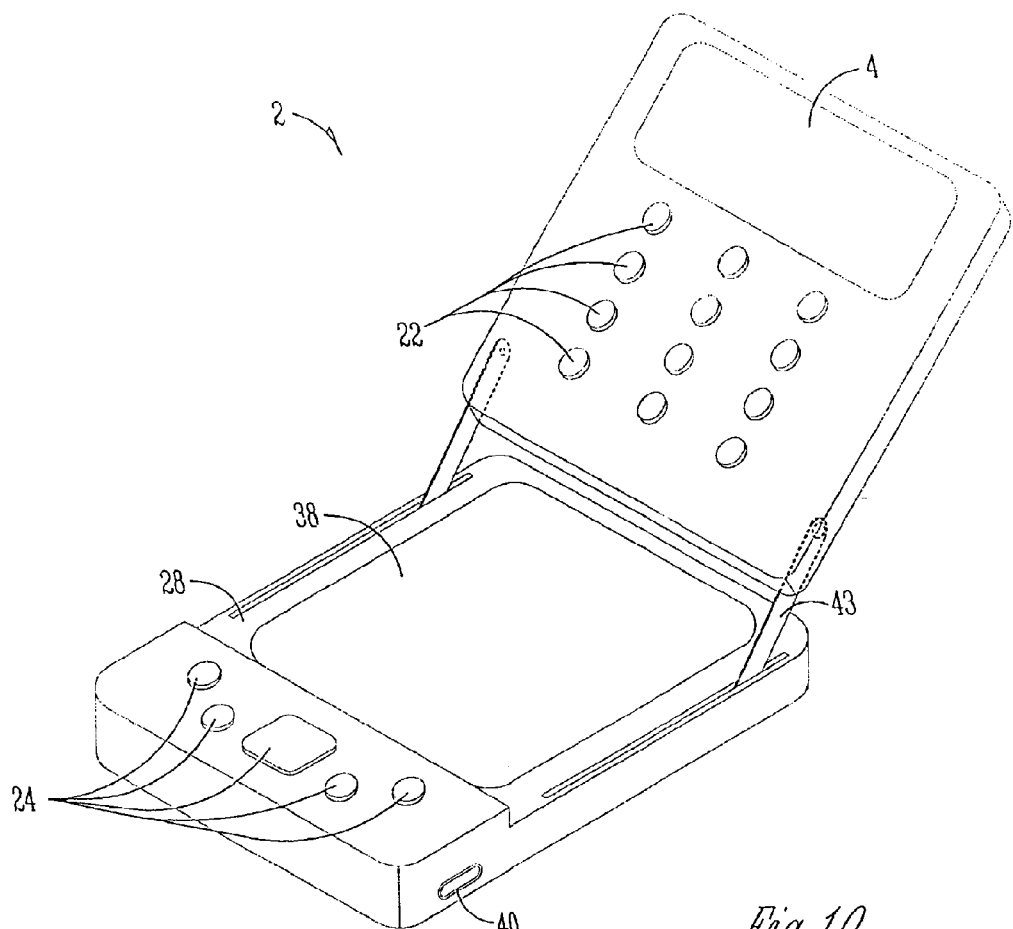
FIG. 10 is a diagram of a hinged embodiment of the personal electronic device in an open position.
Figure 11:
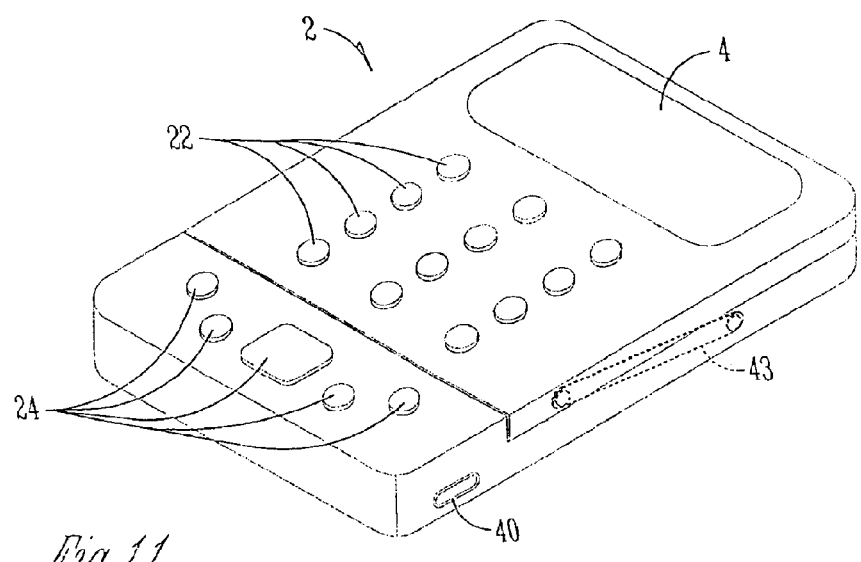
FIG. 11 is a diagram of a hinged embodiment of the personal electronic device in a closed position.

FIGS. 10 and 11 show the personal electronic device 2 with an interiorly mounted slide hinge 43. The present invention contemplates that the angle between the telephone portion and the PDA portion may be adjusted by altering the position of the interiorly mounted slide hinge 43 or pivoting on the pivot points of the interiorly mounted slide hinge 43.

The present invention also contemplates that a lateral hinge may be used. The lateral hinge allows the personal electronic device 2 to be opened in a manner such that both the PDA portion and the cellular telephone keypad portion are accessible at the same time. The present invention also contemplates other variations such as one or more slide hinges, lateral hinges, collapsible hinges, slide joints, lateral joints or similar mechanisms. The present invention also contemplates that a ratchet mechanism may be built into a hinge or otherwise used to open the personal electronic device 2. Using a ratchet mechanism or other device, the personal electronic device is constructed in a manner that permits the personal electronic device 2 to be opened at various angles. For example, the personal electronic device 2 may be opened at a full 180° angle such that both the PDA portion and the cellular portion are flat. In addition, other angles may be used such as 60°, 90°, 120°, 150°. This permits additional flexibility for the user in that an LCD display on the cellular phone portion may be better viewed, keys may be more easily accessed, glare on the PDA's display may be eliminated or reduced, or for other reasons that a particular use or environment may suggest.

It should be readily apparent that the present invention may be implemented in a number of different ways with regards to the specific construction techniques used to allow the device to open in a manner such that both the keypad and the touch screen are accessible when the device is in an open position. As previously discussed, a ratchet wheel can be used with inner teeth for compact assembly or outer teeth. Motorized opening and closing is also facilitated with the motorized operating of the ratchet wheel. When a ratchet mechanism is used there may be multiple pawls placed side by side for finer adjustment of the angle of the keypad portion relative to the touch screen display portion. In addition, a flexible coil can be used, the flexible coil allowing the position of the keypad portion to be adjusted with respect to the touch screen portion. The keypad portion may slide into position. The slide mechanism may be located on the side of the device and may include slots along the side of the device or other implementation. In addition, the device may be configured such that the keypad portion is slidably mounted to the back or interior of the display portion.

Figure 12:
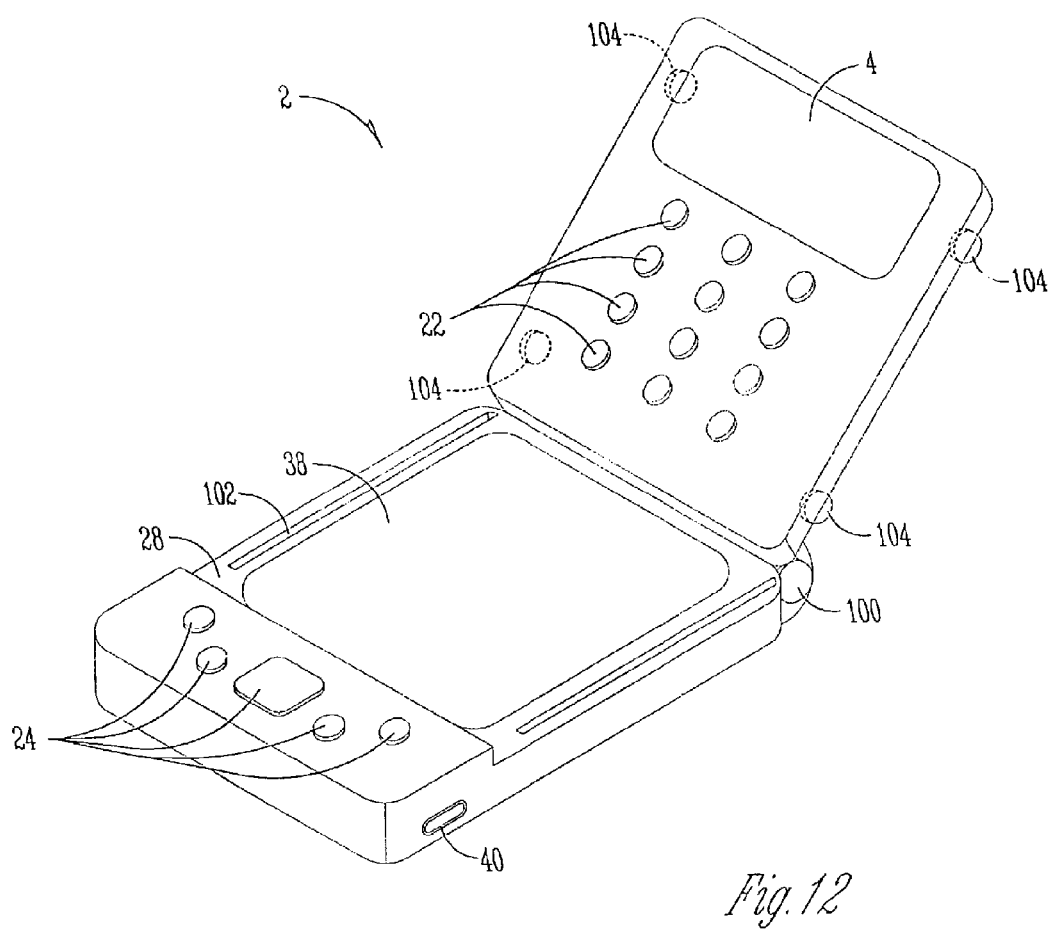
FIG. 12 is a diagram of a personal electronic device according to another embodiment of the invention.

FIG. 12 illustrates another variation of the present invention. In FIG. 12, the personal electronic display 2 is shown. The telephone transceiver portion has a plurality of wheels or rollers 104. These rollers are adapted to fit within the track 102. The present invention contemplates that the track may shallow near the top most portion of the track. The rollers 104 permit the telephone transceiver portion of the personal electronic device 2 to be slidable and/or glidable in order to permit separation from the PDA portion of the personal electronic device 2 in a manner that provides a user with access to both the buttons 22 on the cellular phone portion and the PDA display 38. Motorized function also facilitates these same actions. Once the telephone transceiver portion slides past the PDA portion it may lock in place. The cellular phone portion may lock in place to a spring hinge 100. The spring hinge 100 allows the tilt position of the telephone transceiver portion to be adjusted.

Figure 13:
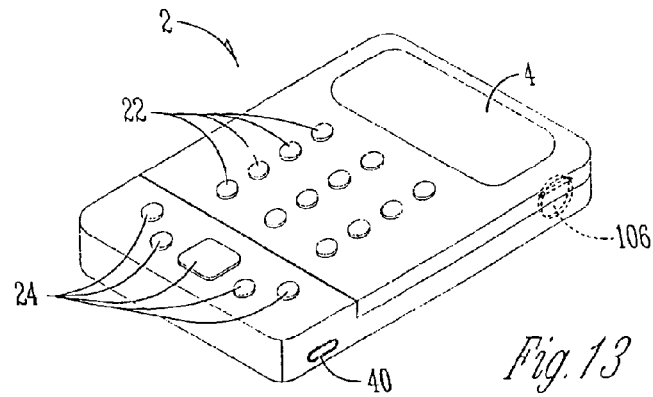
FIG. 13 is a diagram of a slidably mounted personal electronic device of the present invention in closed position.
Figure 14:
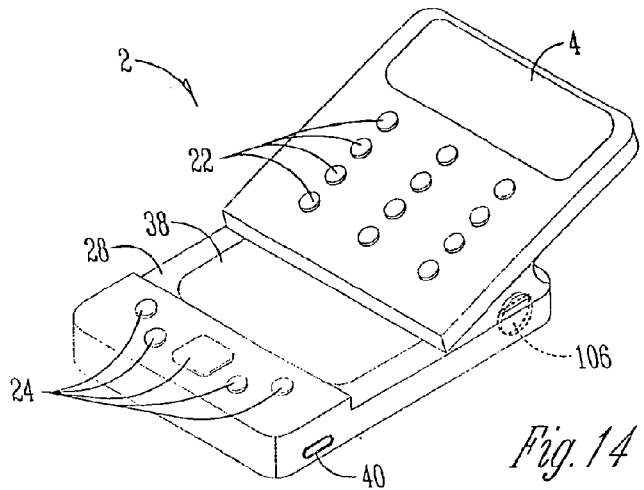
FIG. 14 is a diagram of a slidably mounted personal electronic device of the present invention in a tilted position.
Figure 15:
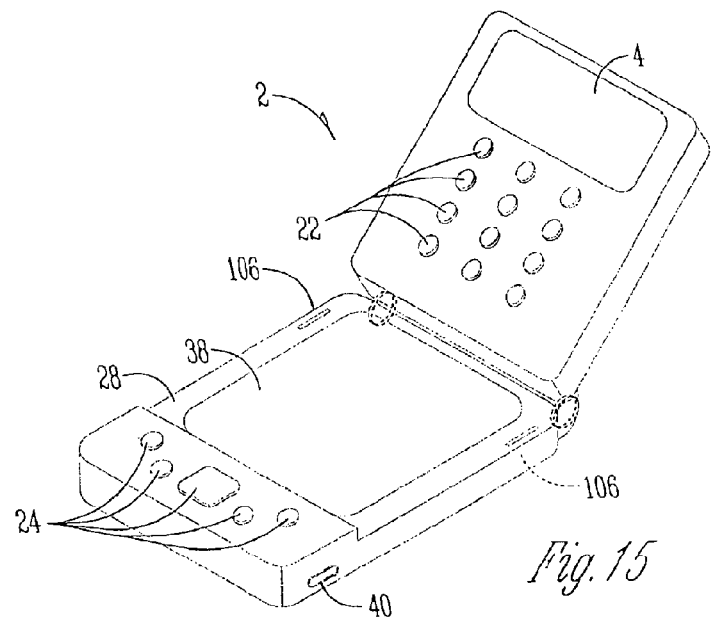
FIG. 15 is a diagram of the personal electronic device of the present invention in another tilted position.

Another variation on the present invention is shown in FIGS. 13 through 15. In FIG. 13 the personal electronic device 2 is shown in a closed position. In FIG. 13 there is an adjustment mechanism 106. In FIG. 14 the telephone transceiver portion is slid through a track slot or other structure in an angled manner. This action is facilitated either manually or through motorized activation, or other forms of electronic actuation. As shown in FIG. 15, once the telephone transceiver portion has been slid past the adjustment mechanism 106, the adjustment mechanism 106 is depressed into the body of the PDA portion. Once the telephone transceiver portion has been slid past the adjustment mechanism 106, the PDA portion may be pivoted to a desirable viewing angle. The present invention contemplates that numerous mechanisms may be used in a similar fashion to permit the telephone transceiver portion to upwardly slide along the PDA portion to a point where it will be adjustable. Electronic actuation, including motorized functionality allow facilitation of the same action.

Figure 16:
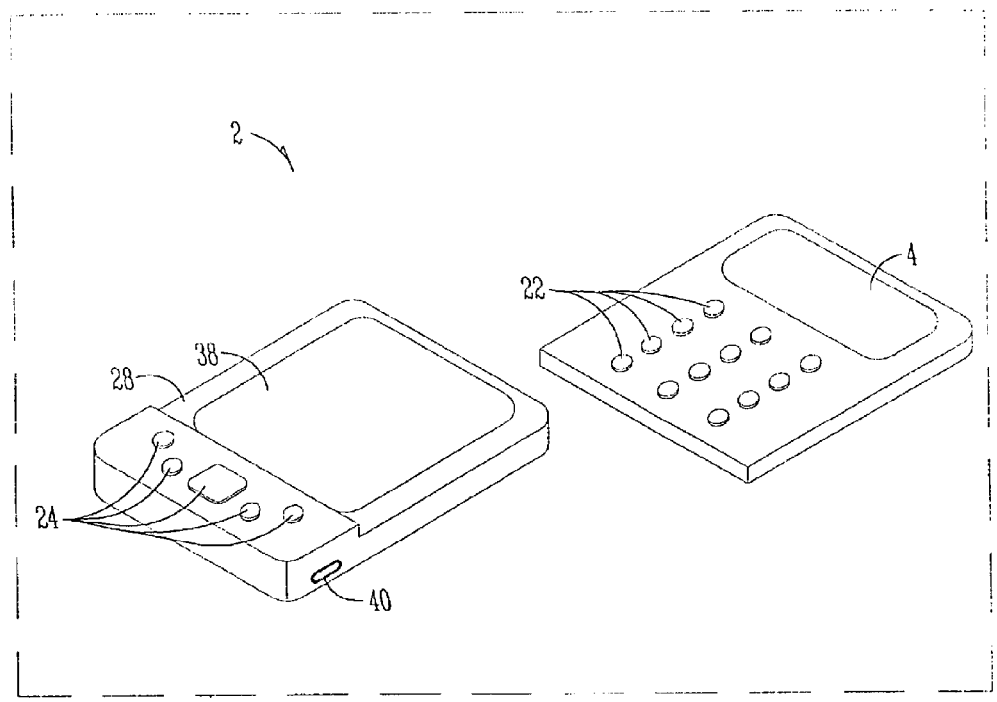
FIG. 16 is a diagram of a removable embodiment of the personal electronic device of the present invention.
Figure 17:
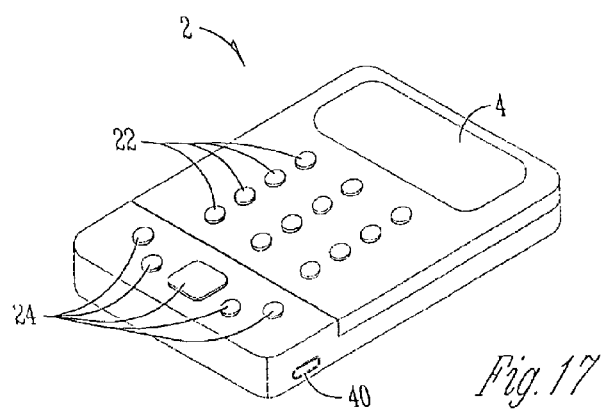
FIG. 17 is a diagram of the removable cellular portion embodiment of the present invention in a docked position.

In FIG. 16, the telephone transceiver portion is removably attached to the PDA portion. The present invention contemplates that the PDA portion and the telephone transceiver portion may communicate wirelessly through any number of wireless protocols and standards. This physical arrangement allows a user to access both the PDA display 38, the PDA buttons 24, the telephone transceiver buttons 22 and the telephone transceiver display for all simultaneously. In FIG. 17, the telephone transceiver portion is fitted onto the PDA portion. The present invention contemplates that the telephone transceiver portion may be locked into place on the PDA portion or otherwise secured in any number of ways. The present invention also contemplates that when in a locked position, the telephone transceiver portion may be in direct electrical connection with the PDA portion to provide for the charging of batteries in the telephone transceiver portion, the exchange of information between telephone transceiver portion and the PDA portion, or for other uses.

Figure 18:
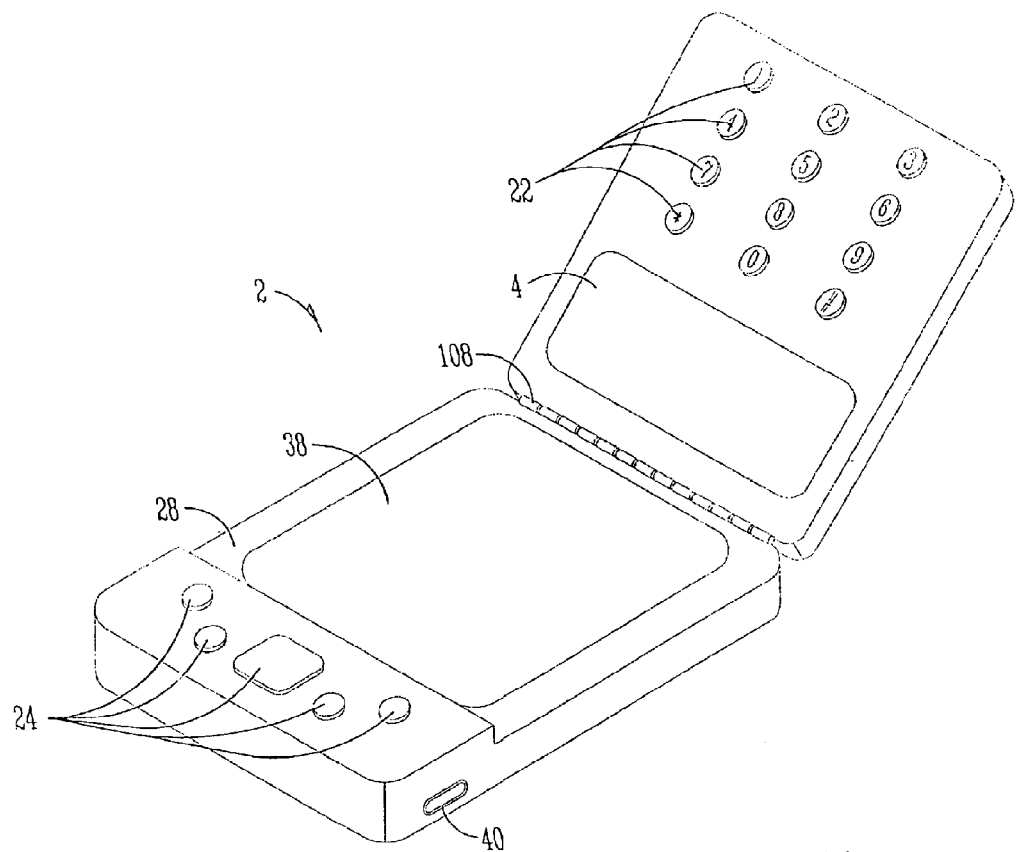
FIG. 18 is a diagram of the personal electronic device of the present invention having a display and buttons accessible on each side of the device.
Figure 19:
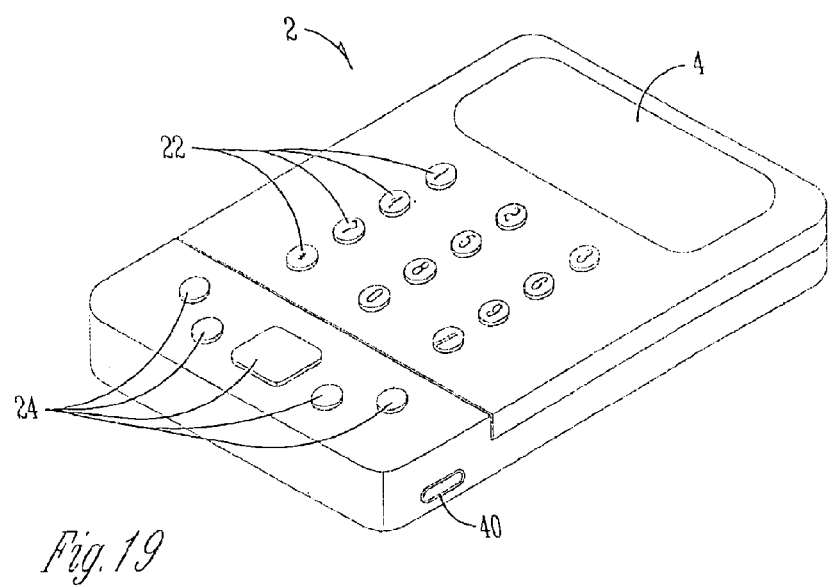
FIG. 19 is a diagram of an embodiment of the present invention having a display in a closed position.

FIGS. 18 and 19 show another variation of the present invention that allow a user simultaneous access to both the PDA portion and the telephone transceiver portion. In FIG. 18, a hinge 108 is used. The hinge 108 is a standard hinge such as may be used in a flip phone or other device. The buttons 22 are accessible from either side of the device. This can be accomplished in multiple ways. For example, two sets of buttons can be used where the buttons share an electrical contact. Alternatively, two sets of buttons can be used, each set of buttons having its own set of contacts. In this variation, the display 4 may be a transparent display. This permits the display to be viewed from either side. It is to be understood that the function of the buttons as well as the display on the screen may need to be reversed or mirrored depending upon the context of the use of the device. For example, when the hinge is in an open position than the display will provide a mirror image of the display image when the personal electronic device 2 is in a closed position. The present invention also contemplates that instead of having a single transparent display, there may be two displays, one on each side of the telephone transceiver portion and both separate and distinct from the PDA display. In addition the present invention contemplates that instead of a display, a see through material such as a plastic material may be used. When in a closed position, a user can see display information through the clear plastic that is displayed on the PDA display 38. When in an open position, the user can also still see PDA display 38. In this manner, the user has access to buttons, both the telephone transceiver portion and the PDA portion at the same time. In addition, the user can always see at least a portion of the PDA display 38 regardless of whether the personal electronic device 2 is in an open position or a closed position if a transparent display is used. Either manual operation or electronic actuation, including motorized functions allow for the opening and closing of the device.

Figure 20:
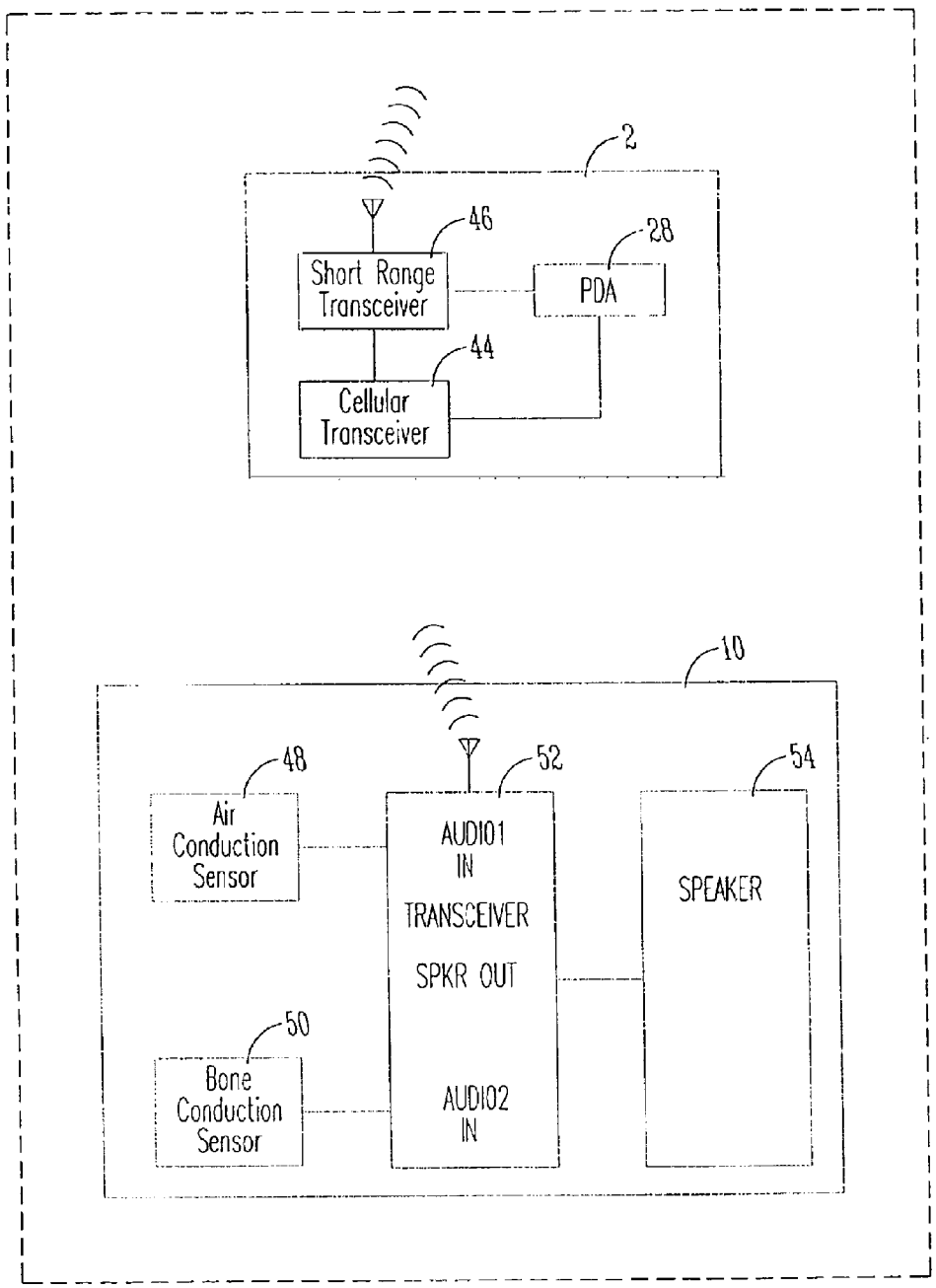
FIG. 20 is a block diagram of the personal electronic device in wireless communication with an earpiece.
Figure 21:
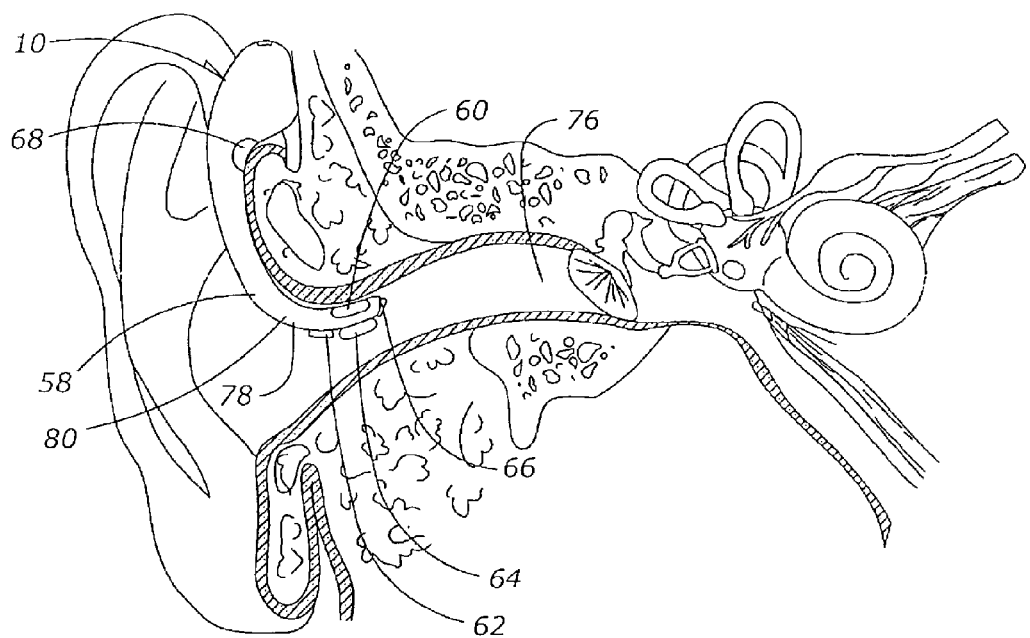
FIG. 21 is a diagram of the earpiece of the present invention fitted within an ear.

FIG. 20 discloses an example of the earpiece 10 of the present invention. The earpiece 10 is designed to be worn at the ear. As shown in FIG. 21, an external canal portion 58 of the earpiece 10 is positioned in the external auditory canal. The external auditory canal portion of the earpiece includes a bone conduction sensor 60 and an air conduction sensor 62 located on a resilient member 78.

The present invention contemplates that the earpiece need not include a speech processor or other processor within the circuit portion 58 of the device. The earpiece need only include a speaker, a bone or air sensor microphone, and transceiver. Use of the earpiece with a bone conduction sensor 60 and an air conduction sensor 62 improves the quality of the sound. Where processing capabilities are not included within the earpiece 10, both a bone conduction sensor and an air conduction sensor can still be used. For example, the transceiver used may be a stereo transceiver. This permits two channels of audio signals to be simultaneously transmitted. The PDA portion of the device may then perform speech processing as required, instead of or in addition to speech processing occurring within the earpiece. By permitting the PDA rather than a portion of the earpiece to perform this processing, the size of the earpiece may be further reduced.

A general description of the present invention as well as a preferred embodiment has been set forth above. Those skilled in the art will recognize and will be able to practice additional variations and the methods and devices described which fall within the teachings of this invention. Accordingly, all such modifications and additions are deemed to be within the scope of the invention which is to be limited only by the claims appended hereto.

I claim:

1. A cellular telephone comprising:
   a telephone housing including a first body and a second body configured so that said first body slides longitudinally and upwardly between a closed position and an open position relative to said second body, and wherein said housing contains:
   1) a cellular telephone module with audio input and output including a cellular telephone transceiver;
   2) at least one radio antenna in said housing electrically coupled to said telephone transceiver and to said short range bidirectional radio frequency transceiver;
   3) a first short range bidirectional radio frequency transceiver coupled to said audio input and output of said cellular telephone module;
   4) a ringer coupled to said cellular telephone and adapted to optionally ring upon occurrence of an incoming call;
   5) a vibration module coupled to said cellular telephone module and adapted to optionally vibrate on occurrence of an incoming call;
   6) a personal digital assistant module containing a first processor;
   7) a display electrically coupled to said cellular telephone module;
   8) a first set of input keys electrically coupled to said cellular telephone module;
   9) a second set of input keys electrically coupled to said personal digital assistant;
   wherein said display is viewable in both said closed and open positions, and wherein at least some of said first or second sets of keys are accessible in both said closed and open positions;
   an earpiece adapted to be worn in a person's ear, said earpiece having an external ear canal portion which is fitted to the ear and an ear attachment portion fitted around the ear, said earpiece containing a second processor, said earpiece containing a second short-range radio transceiver;
   a second radio antenna in said earpiece electrically coupled to said second short range bidirectional transceiver;
   10) executable computer instructions running on said first processor adapted to perform voice recognition;
   11) executable computer instructions running on said first processor adapted to perform handwriting recognition;
   12) executable computer instructions running on said second processor adapted to perform speech enhancement;
   wherein said first short range bidirectional radio frequency transceiver couples cellular telephone call information from said cellular telephone to said earpiece.

* * * * *